United States Patent [19]

Sugimori et al.

[11] 4,104,661
[45] Aug. 1, 1978

[54] SAFETY DEVICE FOR AUTOMATIC EXPOSURE CONTROL CAMERA HAVING MOTOR DRIVE EQUIPMENT

[75] Inventors: Shiro Sugimori; Kenji Toyoda, both of Kawasaki, Japan

[73] Assignee: Nippon Kogaku K.K., Tokyo, Japan

[21] Appl. No.: 620,423

[22] Filed: Oct. 7, 1975

[30] Foreign Application Priority Data

Oct. 14, 1974 [JP] Japan ............................ 49-122776[U]

[51] Int. Cl.² .............................................. G03B 1/18
[52] U.S. Cl. .................................................... 354/173
[58] Field of Search ............... 354/170, 171, 173, 204, 354/205, 206, 212, 213, 214, 266, 268, 295; 352/121, 137, 176

[56] References Cited

U.S. PATENT DOCUMENTS

| | | |
|---|---|---|
| 3,688,669 | 9/1972 | Ogiso et al. ........................ 354/171 |
| 3,693,524 | 9/1972 | Furuta ............................. 354/268 X |
| 3,754,455 | 8/1973 | Tsujimoto et al. .................. 354/173 |
| 3,763,755 | 10/1973 | Kuramoto et al. ................. 354/173 |
| 3,898,679 | 8/1975 | Ogiso et al. ....................... 354/173 |

FOREIGN PATENT DOCUMENTS 1,079,944  4/1960  Fed. Rep. of Germany ........... 354/170

*Primary Examiner*—L. T. Hix
*Assistant Examiner*—William B. Perkey
*Attorney, Agent, or Firm*—Shapiro and Shapiro

[57] ABSTRACT

This invention provides a safety device for automatic exposure control camera having motor drive equipment, which includes a phototaking switch externally manually operable for energizing the motor drive equipment when the switch is closed, an auxiliary switching device connected in series with the phototaking switch, a main switching device for actuating the exposure control circuit when the main switching device becomes conductive, and means for interlocking the main switching device and the auxiliary switching device for closing these switching devices substantially simultaneously.

8 Claims, 5 Drawing Figures

SAFETY DEVICE FOR AUTOMATIC EXPOSURE CONTROL CAMERA HAVING MOTOR DRIVE EQUIPMENT

BACKGROUND OF THE INVENTION

1. Field of the Invention

This invention relates to a camera having a motor drive equipment and an automatic exposure control circuit, and especially to a safety device for such camera.

2. Description of the Prior Art

In a camera of the type as mentioned, it is necessary to firstly actuate the exposure control circuit and then actuate the motor drive device for phototaking because the exposure control circuit automatically determines a shutter speed or stop value for obtaining a proper exposure so that before the shutter release operation by the motor drive equipment, the exposure control circuit should have to actuate so as to determine a shutter speed or a stop value giving a proper exposure.

For this purpose, it is necessary not to operate the motor drive device unless the exposure control circuit of the camera is actuated, but there was no effective safety device to achieve this purpose.

SUMMARY OF THE INVENTION

The object of this invention is to provide a safety device to prevent the motor drive device from operating unless the exposure control is actuated. According to this invention, a separate switch is provided in series with the phototaking switch of the motor drive device and the separate switch is interlocked with the power source switch of the camera.

DESCRIPTION OF THE PREFERRED EMBODIMENTS

Figure 1:
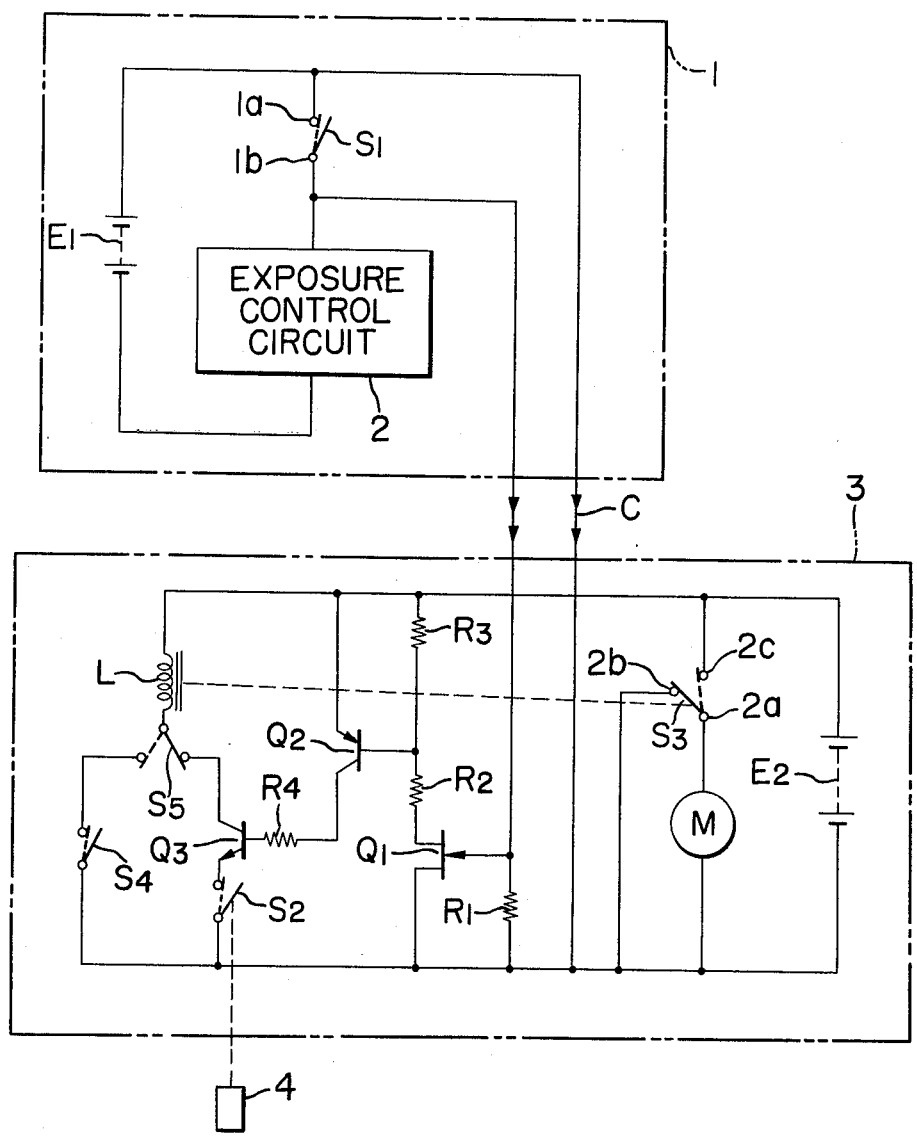
FIG. 1 shows a circuit of a first embodiment of this invention.

FIG. 1 shows a circuit of a first embodiment in which the camera and the motor drive device are removably assembled. In this figure, exposure control circuit 2 is actuated for receiving power from the source E1 by closing the switch S1 ("main switching means"), which is a conventional switch closed when the winding lever of the camera is pulled out at the position of use and opened when it is received in its housed position. Reference numerals 1 and 3 are the camera body and the motor drive device. The phototaking switch S2 is interlocked with the phototaking button 4 of the motor drive device and is closed while the button 4 is depressed. The relay coil L which is connected in series with the switch S2 is provided for switching the release switch S3. The motor M is connected in parallel with the source E2 through the relay switch S3. When the contact 2a of the switch S3 is connected to the contact 2c by the relay coil L, the motor M rotates and when the contact 2a is connected to the contact 2b, the motor is stopped. The switch S5 is switched to the dotted line position when the shutter is released and is returned when the film winding is completed. The switch S4 is closed when the switch S5 is in its dotted line position so as to rotate the motor for winding the film. The switches S4 and S5 are conventional switches. The connector C is to electrically connect the motor drive device 3 with the camera body 1 when the device is mounted on the body 1.

The contact 1a of the source switch S1 of the camera is connected to the negative pole of the electric source E2 and the contact 1b is connected to the negative pole of the source E2 through the resistor R1. The gate of the depletion type field effect transistor (FET) Q1 is connected to the junction of the resistor R1 and the contact 1b of the switch S1 to detect the potential of the junction so as to determine whether or not the switch S1 is closed. The base of the transistor Q2 is connected to the drain of FET Q1 through the resistor R2. The emitter of the transistor Q2 is connected to the positive pole of the source E2 and the collector thereof is connected to the base of the switching transistor Q3 (auxiliary switching means), of which the collector is connected to one of the contacts of the timing switch S5 and the emitter is connected to the switch S2. FET Q1, transistor Q2 and resistors R1, R2, R3 and R4 constitute "interlocking means" for preventing the erroneous operation.

When the switch S1 is closed FET Q1 conducts and transistors Q2 and Q3 become conductable. Thereafter, the switch S2 is closed, transistors Q2 and Q3 become conductive and relay coil L is excited so that the contact 2a of the switch S3 is switched from the contact 2b to the contact 2c and motor M rotates with the aid of the supply of the power from the source E2, and the photograph of the proper exposure is automatically phototaken.

Reversely, when the switch S2 is closed before the switch S1 is closed, motor M does not rotate since FET Q1 is not conductive and transistors Q2 and Q3 are not conductive, so that no phototaking is happened.

Figure 2:
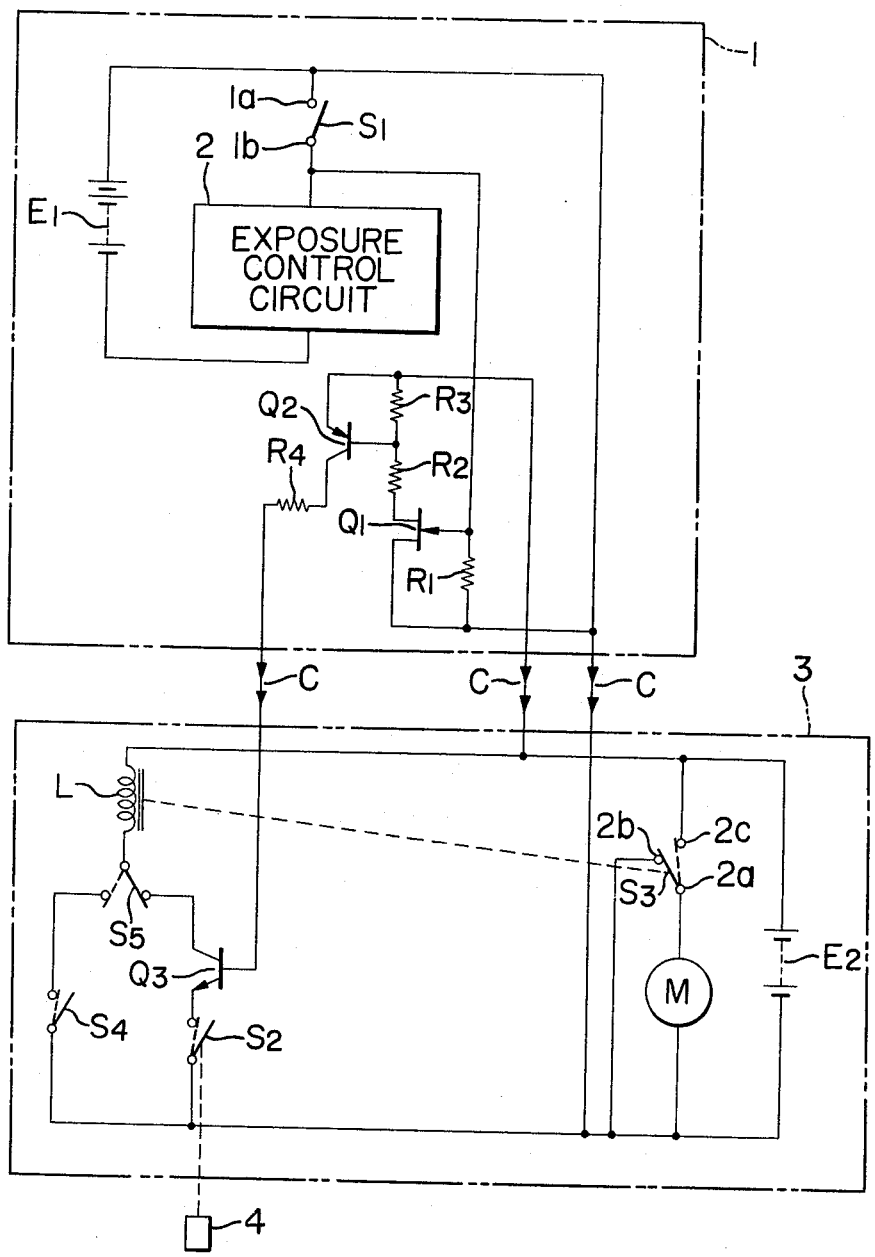
FIG. 2 shows a circuit of a second embodiment.

In the first embodiment of FIG. 1, the safety switch circuit is provided at the motor drive device 3, but it is possible to provide it at the camera 1, and FIG. 2 shows the latter embodiment, the operation of which is quite the same as in case of FIG. 1 and the explanation thereof is omitted.

Figure 3:
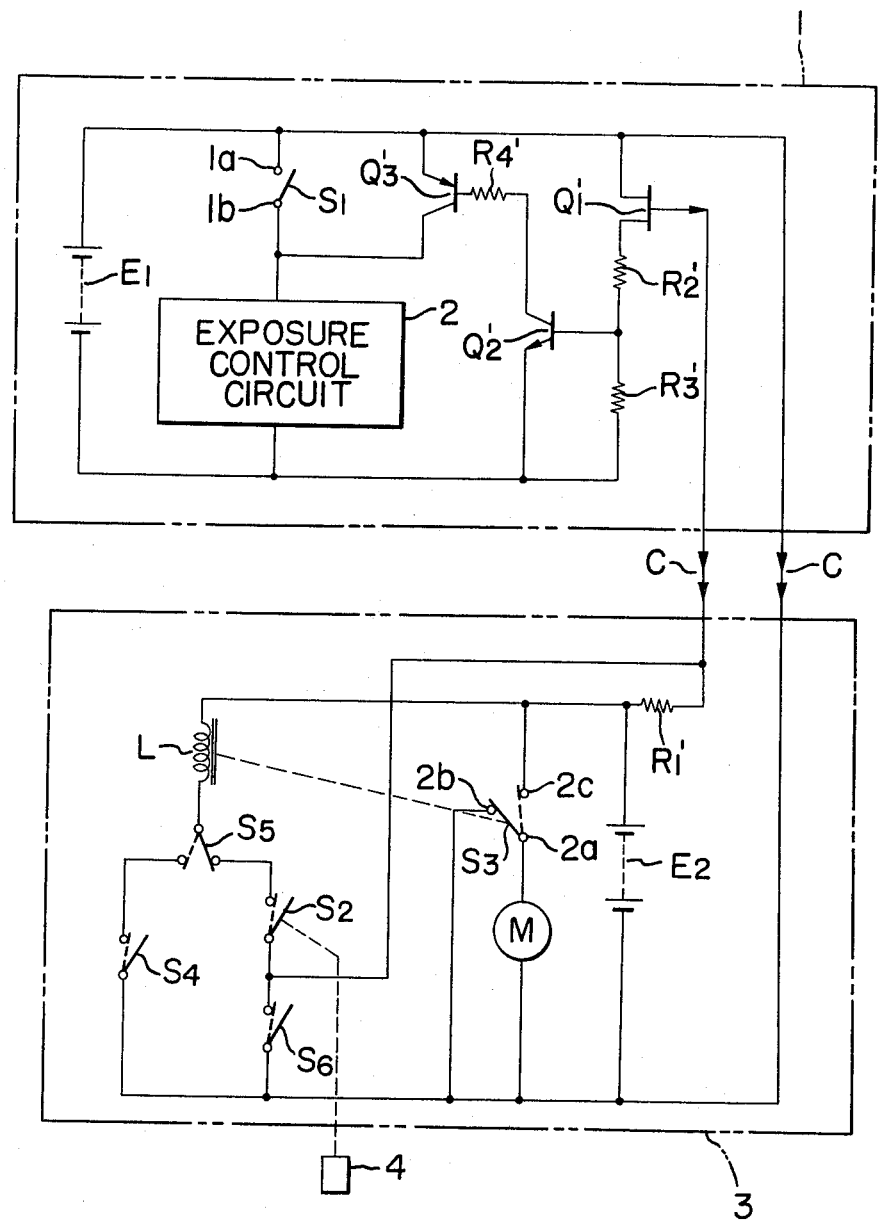
FIGS. 3, 4 and 5 show circuits respectively of third, fourth and fifth embodiments of this invention.

FIG. 3 shows a third embodiment in which the safety switch circuit is provided in parallel with the switch S1 (switch Q'3 serving as the "main switching means"); and mechanical switch S6 auxiliary switching means is externally and manually operably provided in series with the phototaking switch S2 and the safety switch circuit is closed when the switch S6 is closed. In FIG. 3, the resistor R1' is to bias the gate voltage of FET Q'1 at the positive potential when the switch S6 is opened. In the third embodiment, as the switch S6 is closed, FET Q'1 becomes conductive and then transistors Q'2 and Q'3 become conductive so that regardless of the opening of the switch S1, the exposure control circuit of the camera operates and thereafter as the switch S2 is closed the motor drive device becomes operates. Elements Q'1, Q'2, and R1'-R4' constitute "interlocking means".

Figure 4:
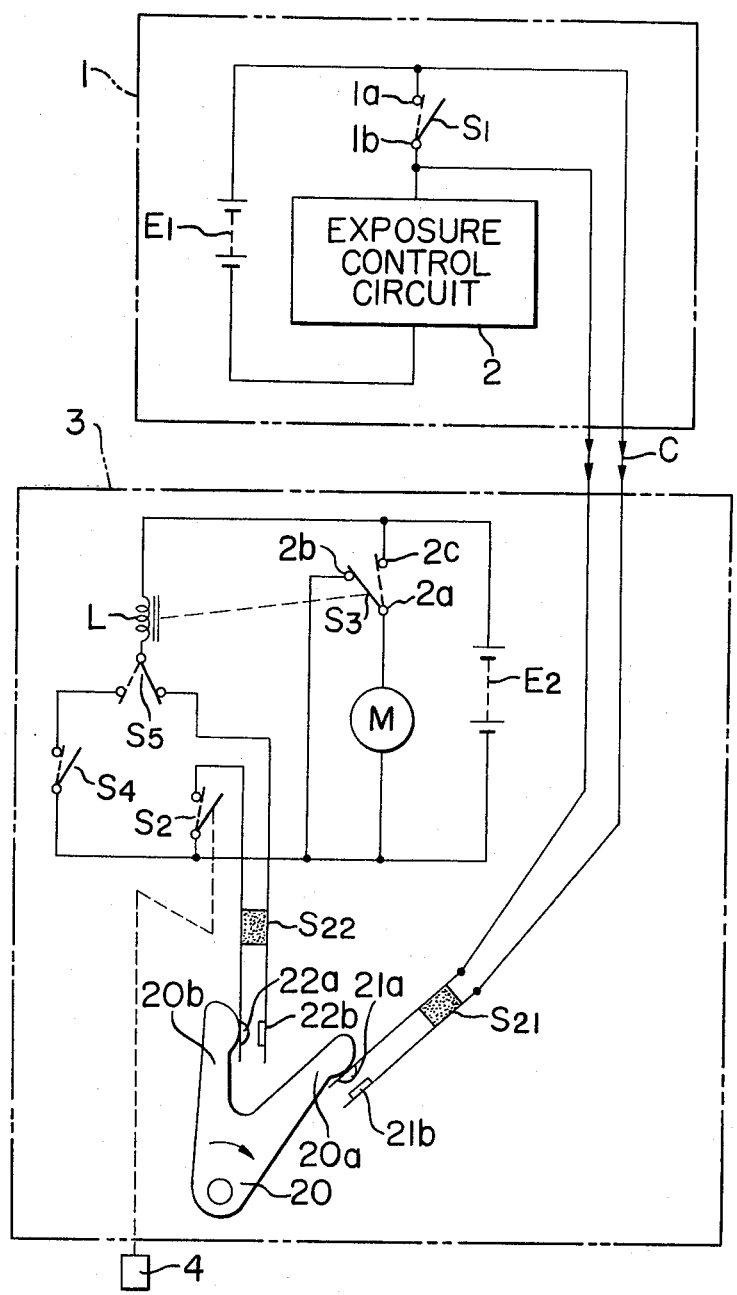

FIG. 4 shows a fourth embodiment, in which the elements playing the same role as those shown in FIG. 1 are designated with the same reference numerals, respectively. In FIG. 4, the first switch S21 ("main switching means") provided at the body 3 is connected in parallel with the switch S1 of the camera.

The safety switch S22 ("auxiliary switching means") is connected in series with the switch S2. The operating lever 20 is rotatably mounted and has two branch levers 20a and 20b. Elements 20, 20a, and 20b constitute "interlocking means". The branch lever 20a engages with one contact 21a of the first switch S21 and the branch lever 20b engages with one contact 22a of the safety switch S22.

When the operation lever 20 is rotated in the arrow direction, the switches S21 and S22 are closed by the branch levers 20a and 20b. And when the switch S2 is closed the motor M rotates by receiving the power from the source E2 and the proper exposure photograph is taken automatically.

In this embodiment, the camera body 1 and the motor drive device 3 are removably mounted; however, in case where the camera body and the motor drive device are made in unison, it is possible to make source switch S1 and safety switch S22 as an interlocking switch and the first switch S21 can be omitted.

Further, there may be a case where the phototaking switch S2 is firstly closed and then source switch S1 is closed, and in this case, when taking the fourth embodiment as an example, it would be better to provide a conventional locking device to prevent the closure of the phototaking switch S2 unless the safety switch S22 is closed. Thus it is possible to avoid the misuse of the switches.

Figure 5:
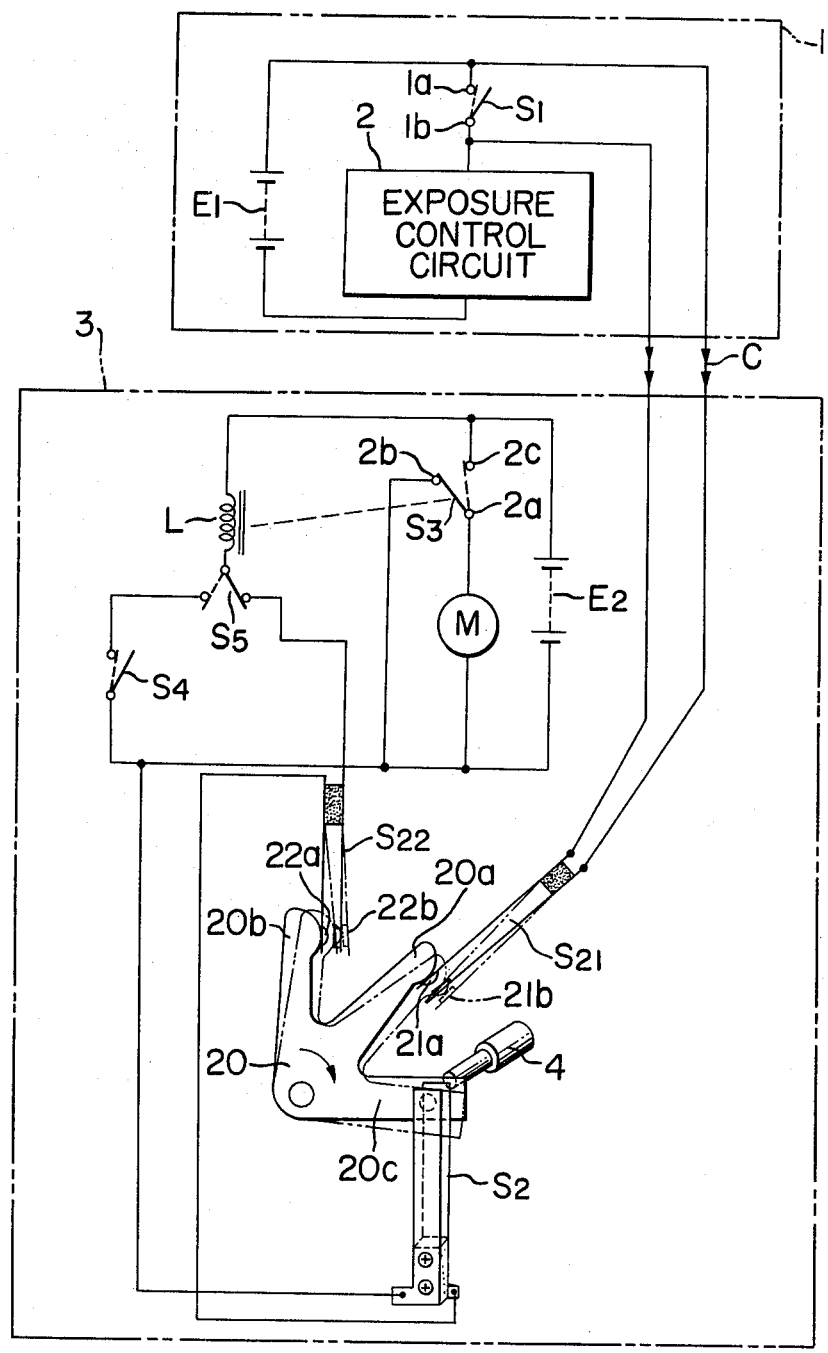

FIG. 5 shows a fifth embodiment in which said locking device is used. In FIG. 5, it is arranged such that when the operating lever 20 is located at the solid line position, the arm 20c, which constitutes the locking means, prevents the phototaking button 4 from closing the phototaking switch S2, and when the operating lever 20 is located at its two-dotted line position, the arm 20c allows the button 4 to close the switch S2.

As explained in the foregoing, according to this invention, the operation of the motor drive device is prevented until after the exposure control circuit is actuated by the closure of the source switch of the camera, so that it is always possible to automatically take a photo at an appropriate exposure. Moreover, unless the source switch is turned on to operate the exposure control circuit, the motor drive device is not actuated even though the phototaking button of the motor drive device is depressed so that it plays a role to caution that the source switch is not turned on.

We claim:

1. In a camera having an exposure control circuit determining shutter speed or stop value for obtaining a proper exposure, an electric motor effecting shutter release, shutter charge and film winding operations when the motor is energized, and a phototaking switching means manually operable from outside the camera for energizing the motor when the phototaking switching means is closed, the improvement comprising, in combination, a main switching means making the exposure control circuit operable when the main switching means becomes conductive, an auxiliary switching means connected in series with the phototaking switching means and interlocking means which interlocks the main and auxiliary switching means to prevent the phototaking switching means from energizing the motor until the main and auxiliary switching means are both conductive.

2. A camera according to claim 1, wherein the main switching means is a mechanical switch manually operable from the outside of the camera, the auxiliary switching means is an electronic switch, and the interlocking means is a switching circuit making the auxiliary switching means conductive when the mechanical switch is closed.

3. A camera according to claim 2, wherein the motor, phototaking switching means, auxiliary switching means and interlocking means are adapted to be connected to the camera body as a motor drive unit for the camera.

4. A camera according to claim 2, wherein the motor, phototaking switching means and auxiliary switching means are adapted to be connected to the camera body as a motor drive unit for the camera, and the interlocking means is provided on the camera body.

5. A camera according to claim 1, wherein the main switching means comprises an electronic switch, the auxiliary switching means comprises a mechanical switch externally and manually operable, and the interlocking means comprises a switching circuit making the main switching means conductive when the auxiliary switching means is closed.

6. A camera according to claim 1, wherein the main switching means comprises a mechanical switch, the auxiliary switching means comprises a mechanical switch provided near the main switching means, and the interlocking means comprises an operating member engageable substantially simultaneously with the main and auxiliary switching means and selectable between a first position where the main and auxiliary switching means are substantially simultaneously closed and a second position where the main and auxiliary switching means are open.

7. A camera according to claim 6, wherein the motor, the phototaking switching means, the main and auxiliary switching means, and the operating member are adapted to be connected to the camera body as a motor drive unit for the camera.

8. A camera according to claim 6, further comprising a locking means to prevent manual operation for closing the phototaking switching means when the operating member is positioned at the second position and to permit manual operation for closing the phototaking switching means when the operating member is positioned at the first position.

* * * * *